United States Patent
Utsumi et al.

(10) Patent No.: US 9,780,593 B2
(45) Date of Patent: *Oct. 3, 2017

(54) ELECTRIC CELLS FOR BATTERY PACK, BATTERY CONTROL SYSTEM, AND BATTERY CONTROL METHOD

(71) Applicant: NEC Corporation, Tokyo (JP)

(72) Inventors: Kazuaki Utsumi, Kanagawa (JP); Keiji Katayama, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 633 days.

This patent is subject to a terminal disclaimer.

(21) Appl. No.: 14/066,142

(22) Filed: Oct. 29, 2013

(65) Prior Publication Data
US 2014/0049225 A1 Feb. 20, 2014

Related U.S. Application Data

(63) Continuation of application No. 13/358,073, filed on Jan. 25, 2012, which is a continuation of application (Continued)

(30) Foreign Application Priority Data
Nov. 6, 2006 (JP) .................................. 2006-300615

(51) Int. Cl.
*H02J 7/00* (2006.01)
*H01M 10/42* (2006.01)

(52) U.S. Cl.
CPC ......... *H02J 7/007* (2013.01); *H01M 10/4207* (2013.01); *H02J 7/0063* (2013.01); *H02J 2007/0067* (2013.01)

(58) Field of Classification Search
CPC ........................... H02J 7/0016; G01R 31/3648
(Continued)

(56) References Cited

U.S. PATENT DOCUMENTS 4,871,956 A 10/1989 Barrella
5,488,282 A 1/1996 Hayden et al.
(Continued)

FOREIGN PATENT DOCUMENTS

CN 1716076 A 1/2006
JP 09-139237 5/1997
(Continued)

OTHER PUBLICATIONS

United States Office Action dated Nov. 19, 2014 received in related U.S. Appl. No. 13/358,073.
(Continued)

*Primary Examiner* — Richard Isla Rodas
*Assistant Examiner* — Johali Torres Ruiz
(74) *Attorney, Agent, or Firm* — Scully, Scott, Murphy & Presser, P.C.

(57) ABSTRACT

There are provided electric cells, a battery pack containing three or more electric cells, a battery control system and a battery control method. An electric cell for a battery pack will be interconnected with another cell to be used as a battery pack. For example, an electric cell comprises an electrochemical cell, a communication unit communicating with other electric cells, a measurement unit acquiring cell-state of the electrochemical cell, and a discharge unit discharging the electrochemical cell. The communication unit transmits a cell-state of the electrochemical cell and receives external information. The discharging unit discharges the electrochemical cell based upon both the cell-state of the electrochemical cell and the received external information.

3 Claims, 8 Drawing Sheets

Related U.S. Application Data

No. 12/446,692, filed as application No. PCT/JP2007/070052 on Oct. 15, 2007, now Pat. No. 8,228,040.

(58) Field of Classification Search
USPC .................................. 320/122, 136, 116, 118
See application file for complete search history.

(56) References Cited

U.S. PATENT DOCUMENTS

| | | | |
|---|---|---|---|
| 5,952,815 A * | 9/1999 | Rouillard | H02J 7/0016 320/116 |
| 6,043,628 A | 3/2000 | Perelle et al. | |
| 6,087,036 A | 7/2000 | Rouillard et al. | |
| 6,531,846 B1 * | 3/2003 | Smith | H02J 7/0029 320/134 |
| 6,555,991 B1 | 4/2003 | Zettel et al. | |
| 6,614,233 B2 | 9/2003 | Sugimoto | |
| 8,228,040 B2 * | 7/2012 | Utsumi | H01M 10/4207 320/116 |
| 2003/0030442 A1 | 2/2003 | Sugimoto | |
| 2005/0024015 A1 * | 2/2005 | Houldsworth | H02J 7/0016 320/119 |
| 2005/0052155 A1 | 3/2005 | Surig | |
| 2005/0242776 A1 | 11/2005 | Emori et al. | |
| 2006/0012337 A1 | 1/2006 | Hidaka et al. | |
| 2006/0071643 A1 | 4/2006 | Carrier et al. | |
| 2006/0125447 A1 * | 6/2006 | Sugimoto | H02J 7/0016 320/132 |
| 2006/0164038 A1 * | 7/2006 | Demers | H02J 7/0014 320/116 |
| 2006/0257732 A1 | 11/2006 | Yageta et al. | |
| 2007/0229034 A1 | 10/2007 | Tatebayashi et al. | |

FOREIGN PATENT DOCUMENTS

| | | |
|---|---|---|
| JP | 09-306550 | 11/1997 |
| JP | 11-1965237 | 7/1999 |
| JP | 11-509669 | 8/1999 |
| JP | 2000-152422 A | 5/2000 |
| JP | 2000-294298 A | 10/2000 |
| JP | 2000-339186 A | 12/2000 |
| JP | 2001-043902 A | 2/2001 |
| JP | 2002-056900 A | 2/2002 |
| JP | 2002-110259 A | 4/2002 |
| JP | 2002-199601 A | 7/2002 |
| JP | 2002-334726 A | 11/2002 |
| JP | 2003-017134 | 1/2003 |
| JP | 2003-059469 A | 2/2003 |
| JP | 2005-278243 | 10/2005 |
| JP | 2005-341645 A | 12/2005 |
| JP | 2006-296036 | 10/2006 |
| JP | 5621816 B2 | 10/2014 |
| WO | 9701725 A1 | 1/1997 |

OTHER PUBLICATIONS

U.S. Office Action dated Mar. 26, 2014 received in a related U.S. Patent Application, namely U.S. Appl. No. 13/358,073.
Japanese Official Action dated Feb. 4, 2014 received from the Japanese Patent Office in related CN201110406873.9.
United States Official Action dated Jun. 17, 2015 received in related U.S. Appl. No. 13/358,073.
Japanese Official Action dated Sep. 16, 2014 received in related JP 2014-003149 together with a partial English language translation.
Notice of Allowance dated Apr. 4, 2012 received in related U.S. Appl. No. 12/466,692.
U.S. Office Action dated Nov. 7, 2013 received in a related U.S. Patent Application, namely U.S. Appl. No. 13/358,073.
Japanese Office Action dated Nov. 12, 2013 from corresponding Japanese application.
Japanese Official Action dated Dec. 16, 2014 received in related JP 2014-003149 together with a partial English language translation.
Japanese Official Action dated Jan. 6, 2015 received in related JP 2014-076858 together with a partial English language translation.
Chinese Official Action dated Dec. 2, 2014 received from the Chinese Patent Office in related CN201110406873.9.
United States Official Action dated Dec. 20, 2016 received from the United States Patent Office in related U.S. Appl. No. 13/358,073.

* cited by examiner

ELECTRIC CELLS FOR BATTERY PACK, BATTERY CONTROL SYSTEM, AND BATTERY CONTROL METHOD

CROSS REFERENCE TO RELATED APPLICATION

The present application is a Continuation application of U.S. Ser. No. 13/358,073 filed Jan. 25, 2012 which is a Continuation application of U.S. Ser. No. 12/446,692 filed on Apr. 22, 2009, which is a '371 filing of PCT/JP2007/070052 filed on Oct. 15, 2007 and claims the benefit of priority from Japanese Patent Application No. 2006-300615, filed on Nov. 6, 2006, the entire disclosures of each of which are incorporated herein by reference.

TECHNICAL FIELD

The present invention relates to an electric cell for a battery pack, a battery control system and a battery control method, and particularly relates to an electric cell for a battery pack, a battery control system and a battery control method which are capable of adjusting a battery voltage.

BACKGROUND ART

There is known a battery control system for adjusting the voltage of a battery pack configured by interconnecting secondary battery cells.

In Patent Document 1 (National Publication of International Patent Application No. 11-509669) described is an energy management system in which information (a voltage of each battery cell, etc.) for controlling the voltage of each battery cell is transmitted in a wired or wireless manner.

In this energy management system, a battery pack where a number of batteries are connected in serial is taken as one unit for control, and each unit is mounted with one battery control module.

This energy management system measures an operating parameter such as a voltage of the entire battery pack, or controls the operating parameter In this energy management system, one control device intensively controls information from a plurality of battery control modules inside a plurality of units for control. Further, this control device transmits a command to the plurality of battery control modules. Examples of a battery for which the system can be used include a nickel-cadmium battery and a lithium polymer battery.

The control device receives a detection result transmitted from each battery control module by wireless. Based upon the detection result, the control device generates a control signal for equalizing voltages of individual battery cells. The control device transmits the control signal to each battery control modules by wireless.

Upon receipt of the control signal, each battery control module discharges the voltage of the battery cell based upon the control signal. It is therefore possible to equalize the voltages of the individual battery cells.

Patent Document 1: National Publication of International Patent Application No. 11-509669.

DISCLOSURE OF THE INVENTION

Problems to be Solved by the Invention

In the energy management system described in Patent Document 1, one control device controls the entire battery pack. This requires each of the electric cells for a battery pack to have a configuration based upon the control device. Hence, for example, changing the number of electric cells connected in series for a battery pack necessitates changing an application of the control device. There have thus been limits on flexibility for a change in design of the battery pack, convenience in manufacturing battery packs in a plurality of applications, and usability on the user's side.

Further, in the energy control system described in Patent Document 1, the following problem occurs since the control device communicates information with each battery control module by wireless.

In wireless communication between the control device and each battery control module, the longer the communication distance, the greater is the noise superimposed on communication information. Therefore, at the time when the control device communicates information with the farthest battery control module, the information is susceptible to noise. When the information is influenced by noise, the control device becomes unable to accurately control the voltage of each battery cell.

Further, in a case where the control device communicates information with each battery control module by wire, a communication line connecting the battery control module and the control device is required for each battery control module, thereby increasing the size of the configuration.

Moreover, the control device exchanges information with each battery control module, thereby increasing the load on the control device.

An object of the present invention is to provide an electric cell for a battery pack, a battery control system and a battery control method which can solve the foregoing problems.

Means for Solving the Problems

An electric cell for a battery pack according to the present invention is one assumed to be interconnected with another electric cell so as to be used as a battery pack, wherein the electric cell is made up of a unit cell and a control circuit, the unit cell is one electrochemical cell, and the control circuit includes: measurement means for acquiring cell-state information at least including a voltage of the unit cell; transmission means for transmitting the cell-state information to the outside; reception means for receiving external information; and means for discharging the unit cell based upon both the cell-state information on the unit cell and the external information, so as to bring the voltages of the interconnected electric cells closer to one another.

In another aspect of the invention, an electric cell comprises an electrochemical cell. The electric cell also comprises a communication unit communicating with other electric cells. The electric cell also comprises a measurement unit acquiring cell-state of the electrochemical cell. The electric cell also comprises a discharge unit discharging the electrochemical cell. The communication unit transmits a cell-state of the electrochemical cell and receives external information. The discharging unit discharges the electrochemical cell based upon both the cell-state of the electrochemical cell and the received external information.

Advantages of the Invention

According to the present invention, the need is eliminated for a device that intensively manages and controls voltages of individual electric cells in a battery pack, and it is possible to improve the flexibility for a change in design of the battery pack, convenience in manufacturing battery packs in a plurality of applications, and usability on the user's side, and it is also possible in the battery control system to resist the influence of noise, prevent an increase in the size of the configuration, and reduce the load on the management device.

Figure 1:
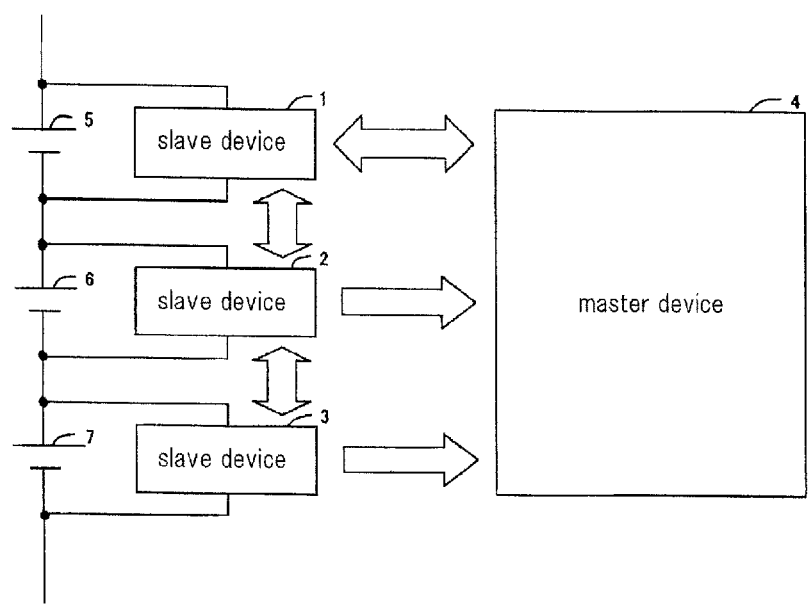
FIG. 1 is a block diagram showing a battery control system of an exemplary embodiment.

DESCRIPTION OF SYMBOLS 1, 2, 3 slave device
1a, 2a, 3a cell voltage detection circuit
1b, 2b, 3b current detecting circuit
1c, 2c, 3c cell temperature detecting circuit
1d, 2d, 3d equalization circuit
1e, 2e, 3e information storing circuit
1e1, 2e1, 3e1 rank storing section
1e2, 2e2, 3e2 first transmittal destination storing section
1e3, 2e4, 3e3 voltage storing section
1e4, 2e5, 3e4 target voltage storing section
2e3 second transmittal destination storing section
1f, 2f, 3f communication circuit
1g, 2g, 3g CPU
1h, 2h, 3h power supply circuit
4 master device
4a, 4d communication circuit
4b information storing circuit
4c relay driving circuit
4e cooling fan driving circuit
4f CPU
4g power supply circuit
5 to 7 cell
8 cooling fan
9a cell element
9b package film
9c metal layer
9d insulating layer
9e sealing layer
9f sealing layer

BEST MODE FOR CARRYING OUT THE INVENTION

In the following, an exemplary embodiment is described with reference to drawings.

FIG. 1 is a block diagram showing a battery control system of a first exemplary embodiment.

In FIG. 1, the battery control system includes three or more slave devices (slave devices 1 to 3 in the present exemplary embodiment), and master device 4.

The plurality of slave devices 1 to 3 are examples of communication devices. The plurality of slave devices 1 to 3 are each made up of one chip, and have been previously ranked. Slave devices 1 to 3 and master device 4 use the ranks as identifies of the respective slave devices. In the present exemplary embodiment, slave device 1 is provided with a rank "1", slave device 2 is provided with a rank "2", and slave device 3 is provided with a rank "3". It is to be noted that in the present exemplary embodiment, the smaller its value, the higher the rank.

Slave device 1 has the highest rank "1", corresponds to cell 5, and detects information on cell 5. Further, slave device 1 communicates with slave device 2 and master device 4 by wire or wireless.

Slave device 1 and cell 5 make up an electric cell. Slave device 1 is an example of a control circuit. Cell 5 is an example of a unit cell.

Slave device 2 corresponds to cell 6, and detects information on cell 6. Further, slave device 2 communicates with slave devices 1 and 3, and master device 4 by wire or wireless.

Slave device 2 and cell 6 make up an electric cell. Slave device 2 is an example of the control circuit. Cell 6 is an example of the unit cell.

Slave device 3 has the lowest rank "3, corresponds to cell 7, and detects information on cell 7. Further, slave device 3 communicates with slave device 2 and master device 4 by wire or wireless.

Slave device 3 and cell 7 make up an electric cell. Slave device 3 is an example of the control circuit. Cell 7 is an example of the unit cell.

Master device 4 transmits an actuating signal to the highest-rank slave device, specifically slave device 1.

Cells 5 to 7 are, for example, lithium ion secondary battery cells. Cells 5 to 7 are connected in series. It is to be noted that cells 5 to 7 may be connected in parallel. Further, highest-rank slave device 1 is adjacent to slave device 2 with a rank next to the highest rank. The lowest-rank slave device 3 is adjacent to slave device 2 with a rank immediately preceding the lowest rank. Slave device 2 is adjacent to slave devices 1 and 3 with ranks immediately preceding and immediately following the rank of slave device 2.

Figure 2:
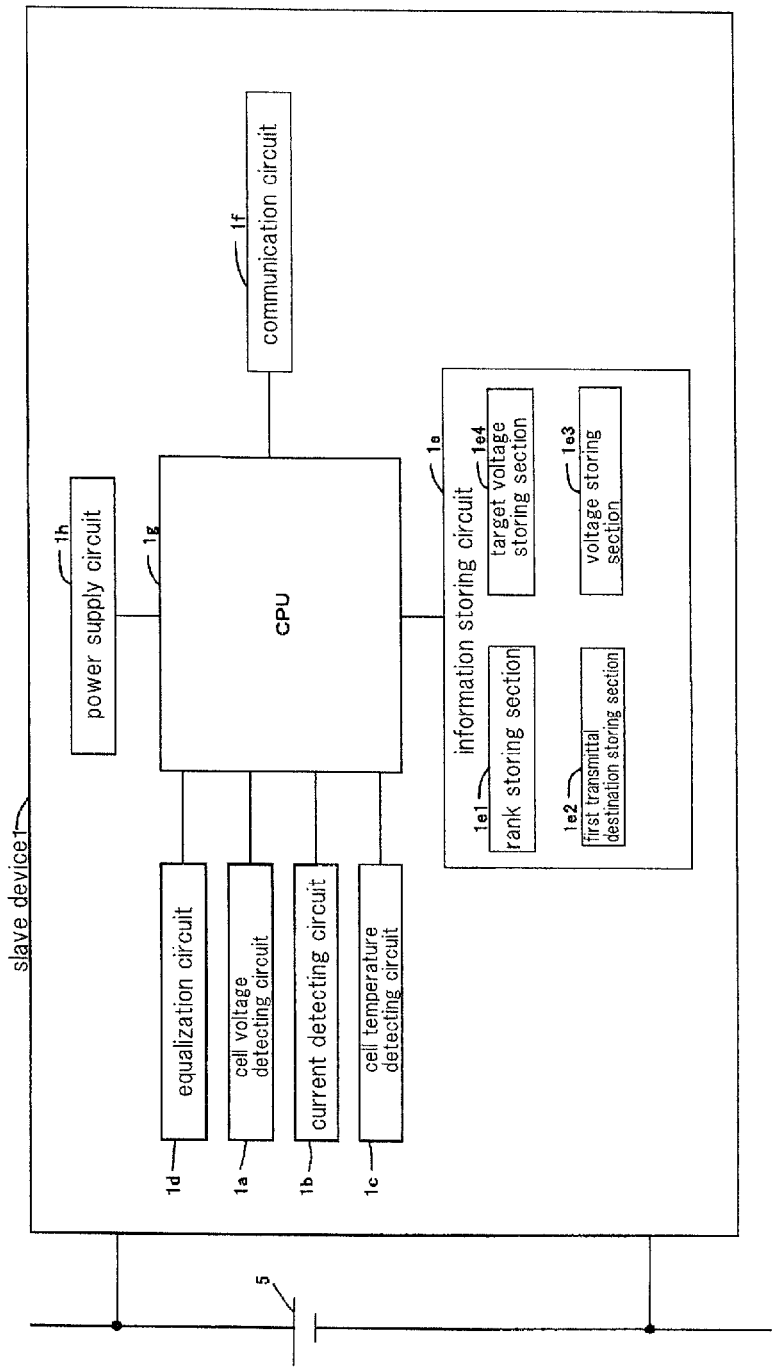
FIG. 2 is a block diagram showing an example of slave device 1.

FIG. 2 is a block diagram showing an example of slave device 1. It should be noted that in FIG. 2, the same one as shown in FIG. 1 is provided with the same symbol.

In FIG. 2, slave device 1 is an example of a highest-rank communication device. Slave device 1 includes cell voltage detecting circuit 1a, current detecting circuit 1b, cell temperature detecting circuit 1c, equalization circuit 1d, information storing circuit 1e, communication circuit 1f, CPU 1g, and power supply circuit 1h. Information storing circuit 1e includes rank storing section 1e1, first transmittal destination storing section 1e2, voltage storing section 1e3, and target voltage storing section 1e4.

Cell voltage detecting circuit 1a can generally be referred to as first detection means and measurement means.

Cell voltage detecting circuit 1a is an example of a first detection section and a measurement section. Cell voltage detecting circuit 1a detects a voltage of cell 5, and provides the voltage value (cell information) to CPU 1g. Current detecting circuit 1b detects a current flowing from cell 5, and provides a value of the current to CPU 1g.

Cell temperature detecting circuit 1c can generally be referred to as measurement means.

Cell temperature detecting circuit $1c$ detects the temperature of cell 5, and provides the temperature (cell-state information) to CPU $1g$.

Equalization circuit $1d$ can generally be referred to as first adjustment means and discharge means.

Equalization circuit $1d$ is an example of a first adjustment section and a discharge section. Equalization circuit $1d$ adjusts the voltage of cell 5. For example, equalization circuit $1d$ is a resistive element having a switch, and when the switch is turned on, current from cell 5 is allowed to flow through the resistive element, so as to decrease the voltage of cell 5.

Information storing circuit $1e$ stores a variety of information.

Rank storing section $1e1$ stores the rank "1" (highest rank) provided to slave device 1.

First transmittal destination storing section $1e2$ stores information on a transmittal destination of information. Specifically, rank "2" as a rank next to highest rank "1" is stored in first transmittal destination storing section $1e2$. It is to be noted that rank "2" is provided to slave device 2. Namely, in first transmittal destination storing section $1e2$, the identifier of slave device 2 is stored as the transmittal destination.

Voltage storing section $1e3$ stores the voltage value detected by cell voltage detecting circuit $1a$.

Target voltage storing section $1e4$ stores a target voltage value. Specifically, in target voltage storing section $1e4$, the lowest voltage value among voltage values of cells 5 to 7 is stored.

Communication circuit $1f$ can generally be referred to as first communication means, transmission means, and reception means.

Communication circuit $1f$ is an example of a first communication section, a transmission section, and a reception section. Communication circuit $1f$ communicates with master device 4 and the transmittal destination stored in first transmittal destination storing section $1e2$.

CPU $1g$ can generally be referred to as first control means.

CPU $1g$ is an example of a first control section. CPU $1g$ controls an operation of slave device 1. For example, CPU $1g$ executes control as follows.

When communication circuit $1f$ accepts the actuating signal from master device 4, CPU $1g$ transmits the voltage value detected by cell voltage detecting circuit $1a$ from communication circuit $1f$ to slave device 2 that is stored as the transmittal destination in first transmittal destination storing section $1e2$.

When communication circuit $1f$ accepts the voltage value from slave device 2, CPU $1g$ makes equalization circuit $1d$ execute an operation of adjusting the voltage of cell 5 to the accepted voltage value. Specifically, CPU $1g$ stores the accepted voltage value into target voltage storing section $1e4$, and then makes equalization circuit $1d$ execute the operation of adjusting the voltage of cell 5 to the voltage value stored in target voltage storing section $1e4$.

Further, CPU $1g$ makes communication circuit $1f$ execute processing to transmit the voltage detected by cell voltage detecting circuit $1a$ and the rank "1" of slave device 1 (identifier of slave device 1) to master device 4. CPU $1g$ makes communication circuit $1f$ execute processing to transmit the current detected by current detecting circuit $1b$ and the rank "1" to master device 4. CPU $1g$ makes communication circuit $1f$ execute processing to transmit the temperature detected by cell temperature detecting circuit $1c$ and the rank "1" to master device 4.

CPU $1g$ gets cell 5 discharged by use of equalization circuit $1d$ based upon both the cell-state information (voltage of cell 5) and external information (information from another electric cell), so as to bring the voltages of the interconnected electric cells closer to each other.

Power supply circuit $1h$ supplies power to each circuit inside slave device 1.

Figure 3:
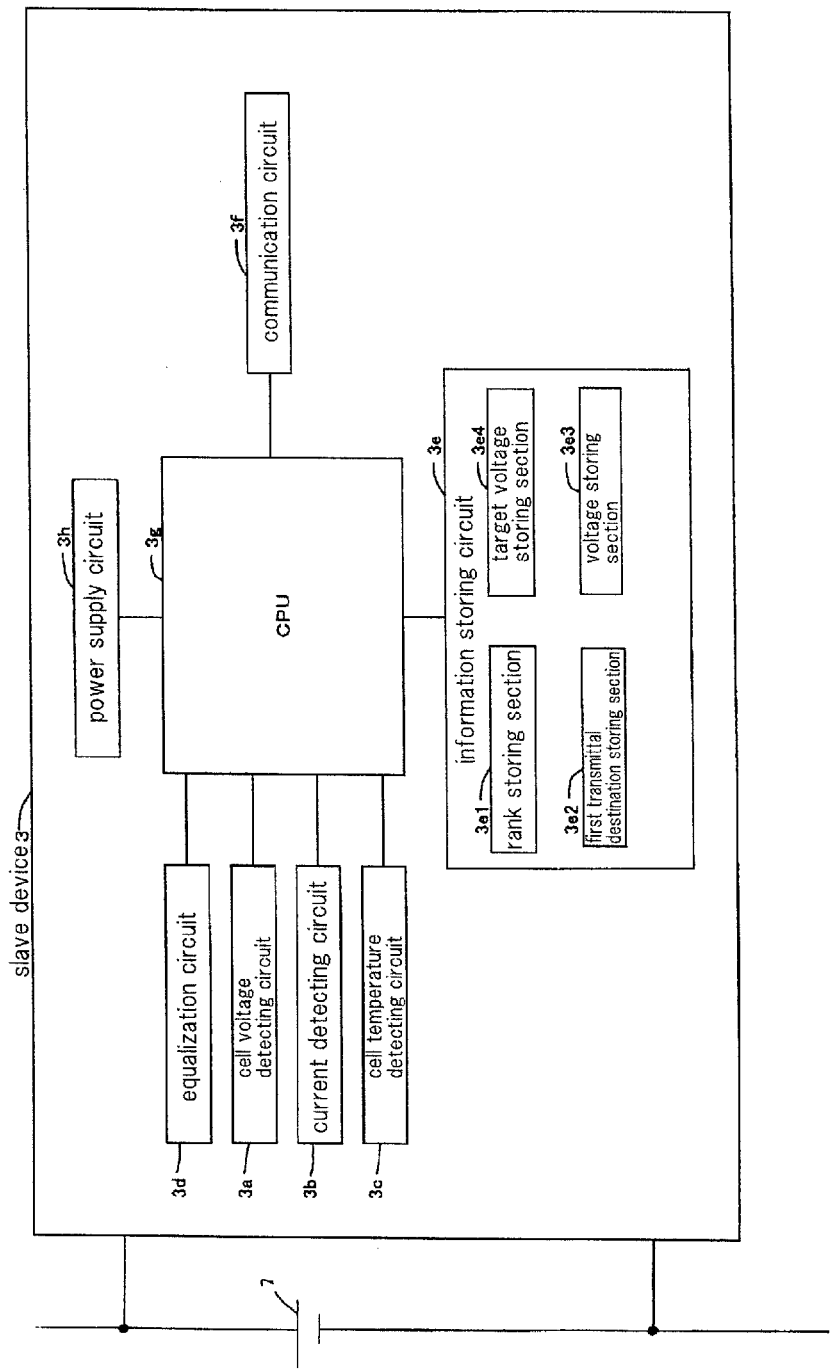
FIG. 3 is a block diagram showing an example of slave device 3.

FIG. 3 is a block diagram showing an example of slave device 3. It should be noted that in FIG. 3, the same component as shown in FIG. 1 is provided with the same symbol.

In FIG. 3, slave device 3 is an example of the lowest-rank communication device. Slave device 3 includes cell voltage detecting circuit $3a$, current detecting circuit $3b$, cell temperature detecting circuit $3c$, equalization circuit $3d$, information storing circuit $3e$, communication circuit $3f$, CPU $3g$, and power supply circuit $3h$. Information storing circuit $3e$ includes rank storing section $3e1$, first transmittal destination storing section $3e2$, voltage storing section $3e3$, and target voltage storing section $3e4$.

Cell voltage detecting circuit $3a$ can generally be referred to as second detection means and measurement means.

Cell voltage detecting circuit $3a$ is an example of a second detection section and a measurement section. Cell voltage detecting circuit $3a$ detects a voltage value of cell 7, and provides the voltage value (cell information) to CPU $3g$. Current detecting circuit $3b$ detects current flowing from cell 7, and provides the value of the current to CPU $3g$.

Cell temperature detecting circuit $3c$ can generally be referred to as measurement means.

Cell temperature detecting circuit $3c$ detects the temperature of cell 7, and provides the temperature (cell-state information) to CPU $3g$.

Equalization circuit $3d$ can generally be referred to as second adjustment means or discharge means.

Equalization circuit $3d$ is an example of a second adjustment section and a discharge section. Equalization circuit $3d$ adjusts the voltage of cell 7. For example, equalization circuit $3d$ is a resistive element having a switch, and when the switch is turned on, current from cell 7 is allowed to flow through the resistive element, so as to decrease the voltage of cell 7.

Information storing circuit $3e$ stores a variety of information.

Rank storing section $3e1$ stores rank "3" (lowest rank) provided to slave device 3.

First transmittal destination storing section $3e2$ stores information on a transmittal destination of information. Specifically, rank "2" as a rank immediately preceding lowest rank "3" is stored in first transmittal destination storing section $3e2$. It is to be noted that rank "2" is provided to slave device 2. Namely, in first transmittal destination storing section $3e2$, the identifier of slave device 2 is stored as the transmittal destination.

Voltage storing section $3e3$ stores the voltage value of cell 7 detected by cell voltage detecting circuit $3a$.

Target voltage storing section $3e4$ stores a target voltage value. Specifically, in target voltage storing section $3e4$, the lowest voltage value among the voltage values of cells 5 to 7 is stored.

Communication circuit $3f$ can generally be referred to as second communication means, transmission means, and reception means.

Communication circuit $3f$ is an example of a second communication section, a transmission section, and a reception section. Communication circuit $3f$ is controlled by CPU 3g, and communicates with master device 4 and the transmittal destination stored in first transmittal destination storing section 3e2.

CPU 3g can generally be referred to as second control means.

CPU 3g is an example of a second control section. CPU 3g controls the operation of slave device 3. For example, CPU 3g executes control as follows.

When communication circuit 3f accepts a voltage value from slave device 2 that is stored as the transmittal destination in first transmittal destination storing section 3e2, CPU 3g selects a lower voltage value between the accepted voltage value and the voltage value detected by cell voltage detecting circuit 3a.

CPU 3g transmits the selected voltage value from communication circuit 3f to slave device 2 that is stored as the transmittal destination in first transmittal destination storing section 3e2.

CPU 3g makes equalization circuit 3d execute the operation of adjusting the voltage of cell 7 to the selected voltage value. Specifically, CPU 3g stores the selected voltage value into target voltage storing section 3e4, and then makes equalization circuit 3d execute the operation of adjusting the voltage of cell 7 to the voltage value stored in target voltage storing section 3e4.

Further, CPU 3g makes communication circuit 3f execute processing to transmit the voltage detected by cell voltage detecting circuit 3a and rank "3" of slave device 3 (identifier of slave device 3) to master device 4. CPU 3g makes communication circuit 3f execute processing to transmit the current detected by current detecting circuit 3b and the rank "3" to master device 4. CPU 3g makes communication circuit 3f execute processing to transmit the temperature detected by cell temperature detecting circuit 3c and the rank "3" to master device 4.

CPU 3g gets cell 7 discharged by use of equalization circuit 3d based upon both the cell-state information (voltage of cell 7) and external information (information from another electric cell), so as to bring the interconnected electric cells closer to one another.

Power supply circuit 3h supplies power to each circuit inside slave device 3.

Figure 4:
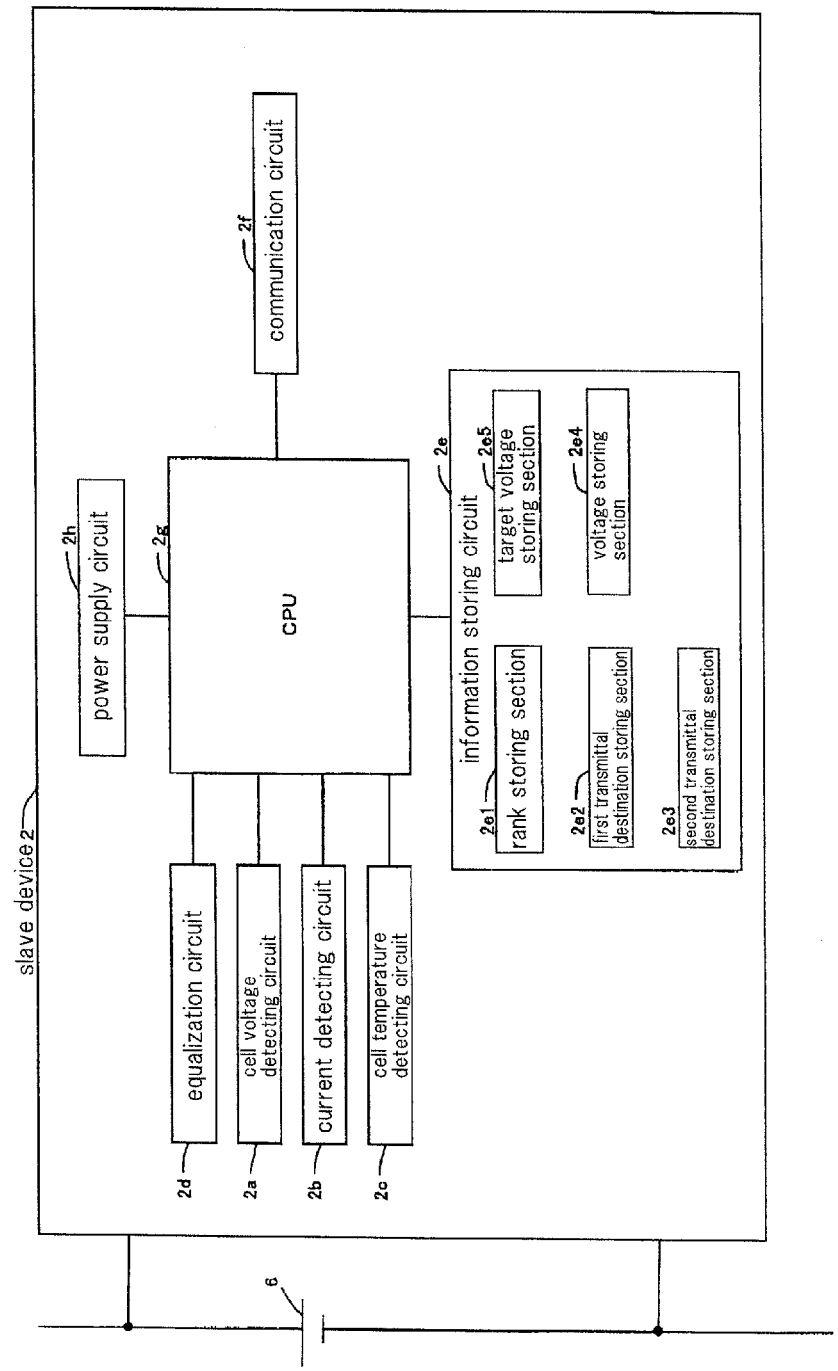
FIG. 4 is a block diagram showing an example of slave device 2.

FIG. 4 is a block diagram showing an example of slave device 2. It should be noted that in FIG. 4, the same symbol is provided to the same component as shown in FIG. 1.

In FIG. 4, slave device 2 is an example of the other communication device. Slave device 2 includes cell voltage detecting circuit 2a, current detecting circuit 2b, cell temperature detecting circuit 2c, equalization circuit 2d, information storing circuit 2e, communication circuit 2f, CPU 2g, and power supply circuit 2h. Information storing circuit 2e includes rank storing section 2e1, first transmittal destination storing section 2e2, second transmittal destination storing section 2e3, voltage storing section 2e4, and target voltage storing section 2e5.

Cell voltage detecting circuit 2a can generally be referred to as third detection means and measurement means.

Cell voltage detecting circuit 2a is an example of a third detection section and a measurement section. Cell voltage detecting circuit 2a detects a voltage of cell 6, and provides the voltage value (cell information) to CPU 2g. Current detecting circuit 2b detects a current flowing from cell 6, and provides a value of the current to CPU 2g.

Cell temperature detecting circuit 2c can generally be referred to as measurement means.

Cell temperature detecting circuit 2c detects the temperature of cell 6, and provides the temperature (cell-state information) to CPU 2g.

Equalization circuit 2d can generally be referred to as third adjustment means and discharge means.

Equalization circuit 2d is an example of a third adjustment section and a discharge section. Equalization circuit 2d adjusts the voltage of cell 6. For example, equalization circuit 2d is a resistive element having a switch, and when the switch is turned on, current from cell 6 is allowed to flow through the resistive element, so as to decrease the voltage of cell 6.

Information storing circuit 2e stores a variety of information.

Rank storing section 2e1 stores rank "2" provided to slave device 2.

First transmittal destination storing section 2e2 stores information on a transmittal destination of information. Specifically, in first transmittal destination storing section 2e2, rank "3" immediately following rank "2" is stored. It is to be noted that rank "3" is provided to slave device 3. Namely, in first transmittal destination storing section 2e2, the identifier of slave device 3 is stored as the transmittal destination.

Second transmittal destination storing section 2e3 stores information on the transmittal destination of information. Specifically, in second transmittal destination storing section 2e3, rank "1" immediately preceding the rank "2" is stored. It is to be noted that rank "1" is provided to slave device 1. Namely, in second transmittal destination storing section 2e3, the identifier of slave device 1 is stored as the transmittal destination.

Voltage storing section 2e4 stores the voltage value of cell 6 detected by cell voltage detecting circuit 2a.

Target voltage storing section 2e5 stores the target voltage value. Specifically, in target voltage storing section 2e5, the lowest voltage value among the voltage values of cells 5 to 7 is stored.

Communication circuit 2f can generally be referred to as third communication means, transmission means, and reception means.

Communication circuit 2f is an example of a third communication section, a transmission section, and a reception section. Communication circuit 2f communicates with the transmittal destination stored in first transmittal destination storing section 2e2, the transmittal destination stored in second transmittal destination storing section 2e3, and master device 4.

CPU 2g can generally be referred to as third control means.

CPU 2g is an example of a third control section. CPU 2g controls an operation of slave device 2.

For example, CPU 2g executes control as follows.

When communication circuit 2f accepts a voltage value from slave device 1 that is stored as the transmittal destination in second transmittal destination storing section 2e3, CPU 2g selects the lower voltage value between the voltage value from slave device 1 and the voltage value detected by cell voltage detecting circuit 2a. Subsequently, CPU 2g transmits the selected voltage value from communication circuit 2f to slave device 3 that is stored as the transmittal destination in first transmittal destination storing section 2e2.

When communication circuit 2f accepts a voltage value from slave device 3 that is stored as the transmittal destination in first transmittal destination storing section 2e2, CPU 2g transmits the voltage value from slave device 3 from communication circuit 2f to slave device 1 that is stored as the transmittal destination in second transmittal destination storing section 2e3.

Thereafter, CPU 2g makes equalization circuit 2d execute an operation of adjusting the voltage of cell 6 to the voltage value transmitted to slave device 1. Specifically, CPU 2g stores the voltage value transmitted to slave device 1 into target voltage storing section 2e5, and then makes equalization circuit 2d execute the operation of adjusting the voltage of cell 6 to the voltage value stored in target voltage storing section 2e5.

Further, CPU 2g makes communication circuit 2f execute processing to transmit the voltage detected by cell voltage detecting circuit 2a and rank "2" of slave device 2 (identifier of slave device 2) to master device 4. CPU 2g makes communication circuit 2f execute processing to transmit the current detected by current detecting circuit 2b and rank "2" to master device 4. CPU 2g makes communication circuit 2f execute processing to transmit the temperature detected by cell temperature detecting circuit 2c and rank "2" to master device 4.

CPU 2g has cell 6 discharged by use of equalization circuit 2d based upon both the cell-state information (voltage of cell 6) and external information (information from another electric cell), so as to bring the voltage of the interconnected electric cells closer to one another.]

Power supply circuit 2h supplies power to each circuit inside slave device 2.

Figure 5:
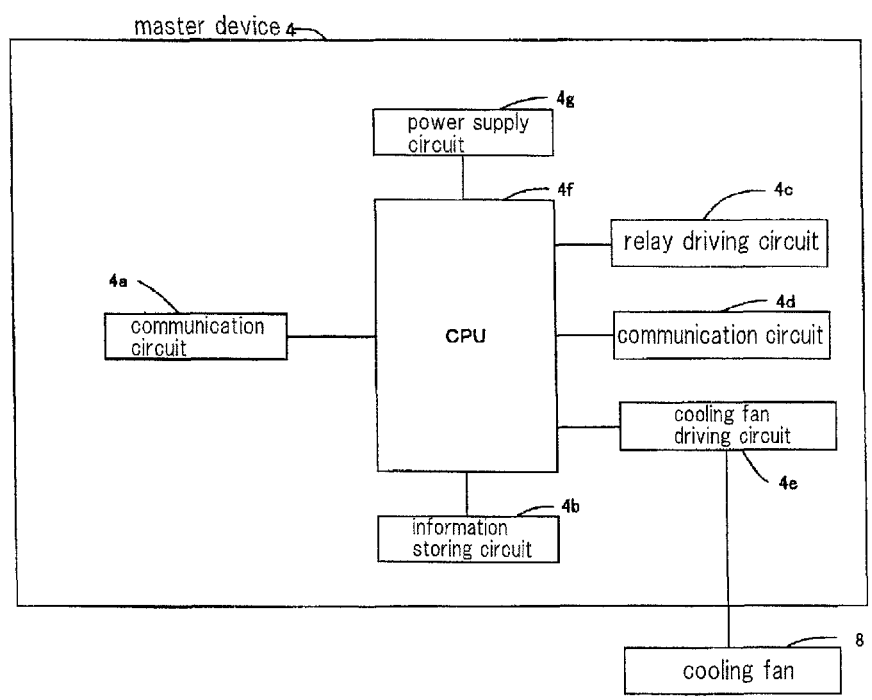
FIG. 5 is a block diagram showing an example of master device 4.

FIG. 5 is a block diagram showing an example of master device 4. It should be noted that in FIG. 5, the same component as shown in FIG. 1 is provided with the same symbol.

In FIG. 5, master device 4 is an example of a management device. Master device 4 manages the plurality of slave devices 1 to 3, and controls cooling fan 8.

Master device 4 includes communication circuit 4a, information storing circuit 4b, relay driving circuit 4c, communication circuit 4d, cooling fan driving circuit 4e, CPU 4f, and power supply circuit 4g.

Communication circuit 4a communicates with slave devices 1 to 3. For example, communication circuit 4a transmits the actuating signal to slave device 1, and receives information on the cells along with the identifiers (ranks) of the slave devices.

Information storing circuit 4b stores a variety of information. For example, relay driving circuit 4c drives a relay (not shown) for activating a circuit, not shown. Communication circuit 4d communicates with another device, not shown. Cooling fan driving circuit 4e drives cooling fan 8. CPU 4f controls an operation of master device 4. Power supply circuit 4g supplies power to each circuit inside master device 4.

Next, operations are described.]

Figure 6:
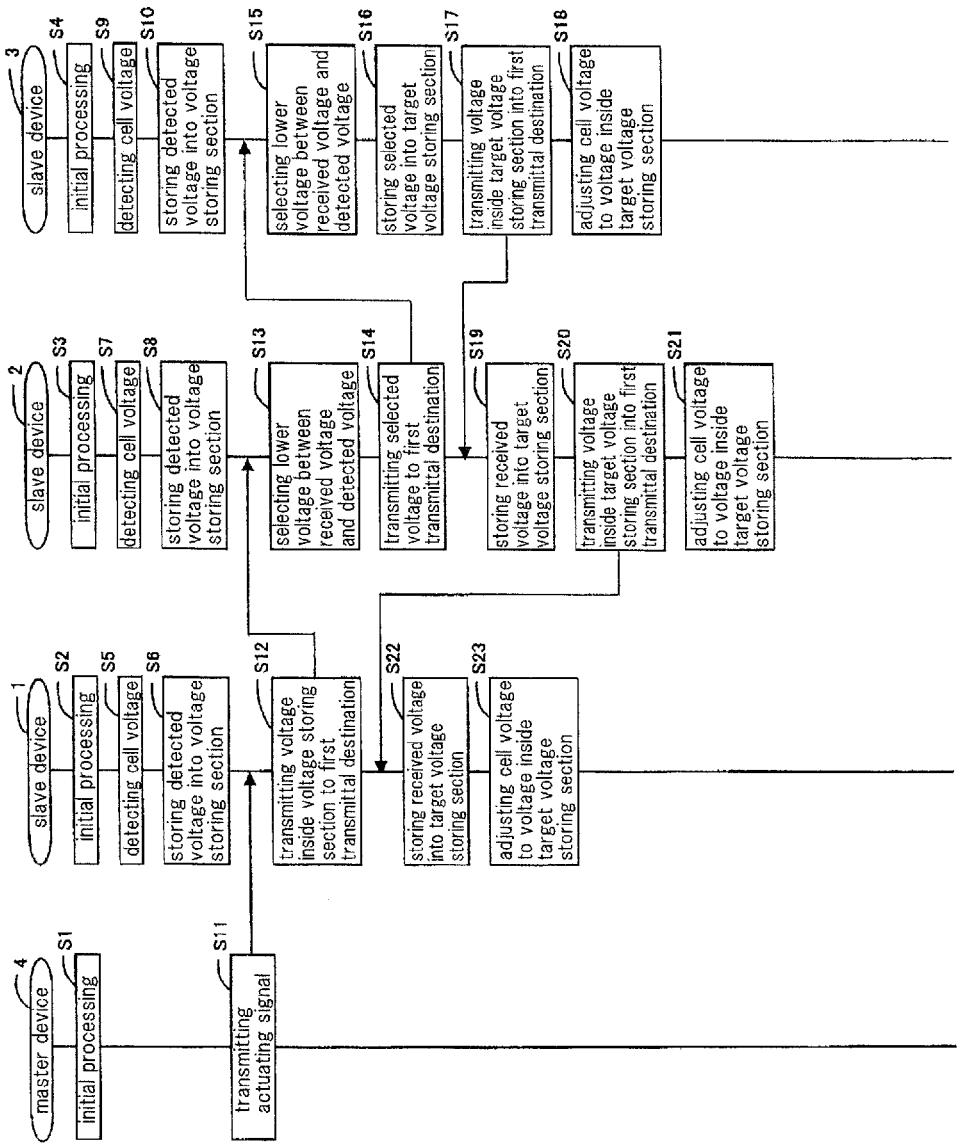
FIG. 6 is a sequence diagram for explaining operations of the battery control system.

FIG. 6 is a sequence diagram for explaining operations of the battery control system. In FIG. 6, the same component as shown in FIG. 1 is provided with the same symbol. In the following, the operations of the battery control system are described with reference to FIG. 6.

When a power switch (not shown) of the battery control system is operated, power supply circuits 1h to 3h of slave devices 1 to 3 and power supply circuit 4g of master device 4 start operating, and power is supplied to each circuit.

CPU 4f of master device 4 and CPUs 1g to 3g of slave devices 1 to 3 perform initial processing upon receipt of the power supply (Steps S1 to S4).

In slave device 1, upon completion of initial processing, CPU 1g makes cell voltage detecting circuit 1a detect the voltage value of cell 5. Upon detection of the voltage value of cell 5, cell voltage detecting circuit 1a provides the voltage of cell 5 to CPU 1g (Step S5). Upon acceptance of the voltage value of cell 5, CPU 1g stores the voltage value of cell 5 into voltage storing section 1e3 (Step S6).

Further, in slave device 2, upon completion of the initial processing, CPU 2g makes cell voltage detecting circuit 2a detect the voltage value of cell 6. Upon detection of the voltage value of cell 6, cell voltage detecting circuit 2a provides the voltage of cell 6 to CPU 2g (Step S7). Upon acceptance of the voltage value of cell 7, CPU 2g stores the voltage value of cell 7 into voltage storing section 2e4 (Step S8).

Further, in slave device 3, upon completion of the initial processing, CPU 3g makes cell voltage detecting circuit 3a detect the voltage value of cell 7. Cell voltage detecting circuit 3a provides the voltage value of cell 7 to CPU 3g (Step S9). Upon receipt of the voltage value of cell 7, CPU 3g stores the voltage value of cell 7 into voltage storing section 3e3 (Step S10).

Thereafter, in master device 4, CPU 4f transmits the actuating signal from communication circuit 4a to slave device 1 (Step S11).

In slave device 1, upon acceptance of the actuating signal, communication circuit 1f provides the actuating signal to CPU 1g. Upon acceptance of the actuating signal, CPU 1g reads the voltage value of cell 5 from voltage storing section 1e3, further reads rank "1" from rank storing section 1e1, and reads rank "2" indicating the transmittal destination from first transmittal destination storing section 1e2. CPU 1g transmits the voltage value of cell 5 and rank "1" from communication circuit 1f to slave device 2 having rank "2" (Step S12).

In slave device 2, upon receipt of the voltage value of cell 5 and rank "1", communication circuit 2f provides the voltage value of cell 5 and rank "1" to CPU 2g. Upon acceptance of the voltage value of cell 5 and rank "1", CPU 2g determines that the information was accepted from slave device 1 because rank "1" indicates a rank immediately preceding rank "2" stored in rank storing section 2e1.

Upon determination that the information was accepted from slave device 1, CPU 2g selects the lower voltage value between the voltage value (reception voltage) of cell 5 and the voltage value (detection voltage) of cell 6 that is stored in voltage storing section 2e4. It is to be noted that, when the voltage value of cell 5 is equivalent to the voltage value of cell 6, CPU 2g may select the voltage value of cell 5, or may select the voltage value of cell 6 (Step S13).

Upon selection of the voltage value, CPU 2g reads rank "2" from rank storing section 2e1, and further reads rank "3" that indicates the transmittal destination from first transmittal destination storing section 2e2. CPU 2g transmits the selected voltage value and rank "2" from communication circuit 2f to slave device 3 having rank "3" (Step S14).

In slave device 3, upon acceptance of the voltage value and rank "2", communication circuit 3f provides the voltage value and rank "2" to CPU 3g. Upon acceptance of the voltage value and rank "2", CPU 3g determines that the information was accepted from slave device 2 because rank "2" indicates a rank immediately preceding rank "3" stored in rank storing section 3e1.

Upon determination that the information was accepted from slave device 2, CPU 3g selects a lower voltage value between the voltage value (reception voltage) and the voltage value (detection voltage) of cell 7 that is stored in voltage storing section 3e3. It is to be noted that, when the accepted voltage value is equivalent to the voltage value of cell 7, CPU 3g may select the accepted voltage value, or may select the voltage value of cell 7 (Step S15).

Therefore, in Step S15, CPU 3g selects the lowest voltage value among the voltage values of cells 5, 6 and 7.

Upon selection of the voltage value, CPU 3g stores the selected voltage value into target voltage storing section 3e4 (Step S16).

Upon storage of the voltage value into target voltage storing section 3e4, CPU 3g reads rank "3" from rank storing section 3e1, and further reads rank "2" indicating the transmittal destination from first transmittal destination storing section 3e2. CPU 3g transmits the selected voltage value and rank "3" from communication circuit 3f to slave device 2 having rank "2" (Step S17).

Upon completion of transmission of the selected voltage value and rank "3", CPU 3g makes equalization circuit 3d execute an operation of adjusting the voltage of cell 7 to the voltage value stored in target voltage storing section 3e4 (Step S18). Hence the voltage of cell 7 becomes equivalent to the lowest voltage value among the voltage values of cells 5, 6 and 7.

In slave device 2, upon receipt of the voltage value and rank "3", communication circuit 2f provides the voltage value and rank "3" to CPU 2g. Upon acceptance of the voltage value and rank "3", CPU 2g determines that the information was accepted from slave device 3 because rank "3" indicates a rank immediately following rank "2" stored in rank storing section 2e1.

Upon determination that the information was accepted from slave device 3, CPU 2g stores the accepted voltage value into target voltage storing section 2e5 (Step S19).

Upon storage of the voltage value into target voltage storing section 2e5, CPU 2g reads rank "2" from rank storing section 2e1, and further reads rank "1" indicating the transmittal destination from second transmittal destination storing section 2e3. CPU 2g transmits the voltage value stored in target voltage storing section 2e5 and rank "2" from communication circuit 2f to slave device 1 having rank "1" (Step S20).

Upon completion of transmission of the voltage value stored in target voltage storing section 2e5 and rank "2", CPU 2g makes equalization circuit 2d execute an operation of adjusting the voltage of cell 6 to the voltage value stored in target voltage storing section 2e5 (Step S21). Hence the voltage of cell 6 becomes equivalent to the lowest voltage value among the voltage values of cells 5, 6 and 7.

In slave device 1, upon receipt of the voltage value and rank "2", communication circuit 1f provides the voltage value and rank "2" to CPU 1g. Upon acceptance of the voltage value and rank "2", CPU 1g determines that the information was accepted from slave device 2 because rank "2" indicates a rank immediately following rank "1" stored in rank storing section 1e1.

Upon determination that the information was accepted from slave device 2, CPU 1g stores the accepted voltage value into target voltage storing section 1e4 (Step S22).

CPU 1g makes equalization circuit 1d execute an operation of adjusting the voltage of cell 5 to the voltage value stored in target voltage storing section 1e4 (Step S23). Hence the voltage of cell 5 becomes equivalent to the lowest voltage value among the voltage values of cells 5, 6 and 7. Accordingly, the voltages of cells 5, 6 and 7 become equivalent to the lowest voltage value among the voltage values of cells 5, 6 and 7.

The present inventors conceived that, at the time of performing voltage-balance control and the like on the entire battery pack, rather than a configuration where a battery pack is controlled using only one intensive control device, a configuration where each cell is separately provided with a determination section that makes a determination necessary for controlling the battery allows improvement in flexibility for changing the design of the battery pack, convenience in manufacturing battery packs in a plurality of applications, and usability on the user's side.

It is to be noted that master device 4 just transmits the actuating signal as a trigger to slave device 1, and does not intensively manage the voltage value of each slave device.

According to the present exemplary embodiment, it is possible to provide a battery, in which a target voltage and current can be obtained while voltage balance among electric cells is voluntarily held, simply by connecting the electric cells and mounting the cells on a target device without creating an intensive management device such as a battery pack balancer on the outside of the battery mounted portion.

Herewith, even in changing the design of the battery pack, such as changing the number of cells in series, the need for re-designing the intensive control device is eliminated, flexibility for changing the design increases, and the usability for the user, namely a manufacturer of equipment to be mounted with the battery, improves. Further, also for a manufacturer of the battery, the convenience in manufacturing battery packs in a plurality of applications increases.

Further, according to the present exemplary embodiment, respective slave devices 1 to 3 communicate information on the voltage values of cells 5 to 7 in the order according to the ranks, and as a result, the lowest voltage value among the voltages of the plurality of cells 5 to 7 is shared among respective slave devices 1 to 3, and the voltages of respective cells 5 to 7 are adjusted to the lowest voltage among those cells.

On this account, when respective slave devices 1 to 3 are arranged according to the ranks, a communication distance among respective slave devices 1 to 3 can be made shorter. Thereby, when slave devices 1 to 3 communicate by wireless, it is possible to make the devices resistant to the influence of noise. Further, when respective slave devices 1 to 3 communicate by wire, it is possible to shorten communication lines, in order to reduce the size of the configuration.

Further, since the need of master device 4 for exchanging information individually with all the slave devices is eliminated, it is possible to reduce load on master device 4.

In the present exemplary embodiment, highest-rank slave device 1 is adjacent to slave device 2 with a rank next to the highest rank, lowest-rank slave device 3 is adjacent to slave device 2 with a rank immediately preceding the lowest rank, and slave device 2 is adjacent to slave devices 1 and 3 with ranks immediately preceding and immediately following the rank of slave device 2.

In this case, the communication distance among respective slave devices is shortened. Hence, when the respective slave devices communicate with each other via a wired connection, it is possible to make the devices resistant to the influence of noise. Further, when the respective slave devices communicate with each other via a wired connection, it is possible to shorten the communication line, in order to reduce the size of the configuration.

Next, a modified example of the present exemplary embodiment is described.

Figure 7:
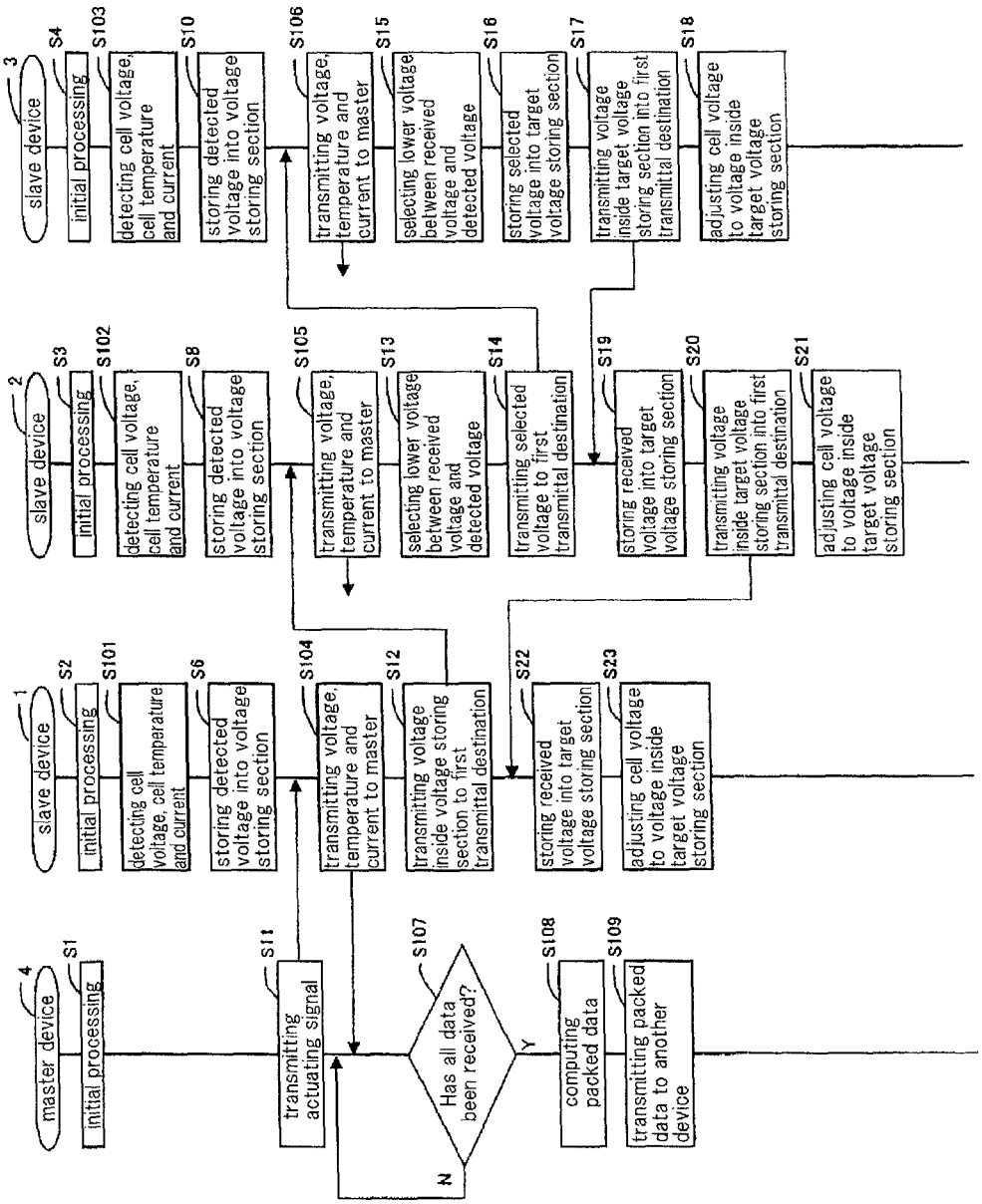
FIG. 7 is a sequence diagram for explaining operations of a modified example of the present exemplary embodiment.

FIG. 7 is a sequence diagram for describing operations of the modified example of the present exemplary embodiment. It should be noted that in FIG. 7, the same operation as the operations shown in FIG. 6 are provided with the same symbols. In the following, the operations of the modified example are described with reference to FIG. 7, concentrating on different points from the operations shown in FIG. 6.

Upon completion of the initial processing, CPU 1g makes current detecting circuit 1b detect current flowing from cell 5 while making cell voltage detecting circuit 1a detect the voltage value of cell 5, and further makes cell temperature detecting circuit 1c detect the temperature of cell 5 (Step S101).

Upon completion of the initial processing, CPU 2g makes current detecting circuit 2b detect current flowing from cell 6 while making cell voltage detecting circuit 2a detect the voltage value of cell 6, and further makes cell temperature detecting circuit 2c detect the temperature of cell 6 (Step S102).

Upon completion of the initial processing, CPU 3g makes current detecting circuit 3b detect current flowing from cell 7 while making cell voltage detecting circuit 3a detect the voltage value of cell 7, and further makes cell temperature detecting circuit 3c detect the temperature of cell 7 (Step S103).

Upon receipt of the actuating signal, CPU 1g transmits the detected cell voltage, cell temperature and current from communication circuit 1f to master device 4 along with rank "1" (identifier of slave device 1) (Step S104).

Upon receipt of the voltage value from slave device 1, CPU 2g transmits the detected cell voltage, cell temperature and current from communication circuit 2f to master device 4 along with rank "2" (identifier of slave device 2) (Step S105).

Upon receipt of the voltage value from slave device 2, CPU 3g transmits the detected cell voltage, cell temperature and current from communication circuit 3f to master device 4 along with rank "3" (identifier of slave device 3) (Step S106).

Upon receipt of data on the cells from slave devices 1 to 3, CPU 4f computes packed data based upon the data (Step S108). It is to be noted that the packed data is data on a battery pack formed by connection of cells 5 to 7.

CPU 4f transmits the packed data from communication circuit 4d to another device (Step S109).

According to this modified example, when transmitting the actuating signal to one slave device 1, master device 4 can accept information on the cells from the plurality of slave devices 1 to 3. Thereby, master device 4 can manage the states of the individual cells.

It is to be noted that, when any of the temperatures of the cells accepted from slave devices 1 to 3 exceeds a prescribed temperature, CPU 4f makes cooling fan driving circuit 4e drive cooling fan 8, to lower the temperature of the cell.

Figure 8:
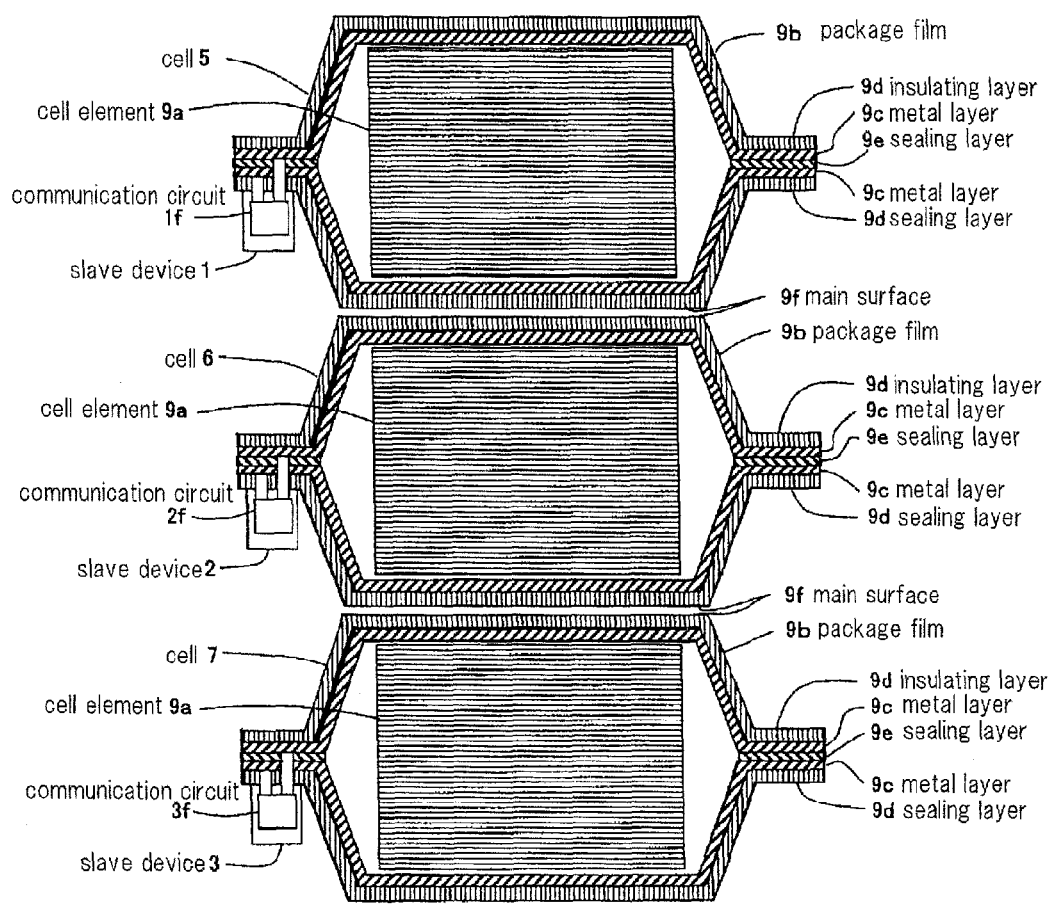
FIG. 8 is an explanatory view showing a battery control system in which package film cells are employed.

FIG. 8 is an explanatory view showing a battery control system in which package film cells are employed. In FIG. 8, the same component as shown in FIG. 1 is provided with the same symbol. It should be noted that in FIG. 8, for the sake of simplifying the description, only communication circuit 1f is shown in slave device 1, only communication circuit 2f is shown in slave device 2, and only communication circuit 3f is shown in slave device 3.

In FIG. 8, cells 5, 6 and 7 are film-packaged cells each including cell element 9a and package film 9b that includes a metal layer. Cell element 9a is made up of a positive electrode plate, a negative electrode plate, an electrolysis solution and the like, and is accommodated by being covered by package film 9b. Package film 9b includes metal layer (e.g. aluminum layer) 9c, insulating layer 9d provided on the outer periphery of metal layer 9c, and sealing layer 9e. Here, the metal layers may be directly bonded to one another without sealing layer 9e. Further, as package film 9b, a laminate film with a sealing layer provided all over the inner periphery of metal layer 9c may be used. The respective cells 5, 6 and 7 are laminated with main surfaces 9f thereof in the state of being opposite to one another.

Cell element 9a is, for example, an element of a lithium-ion battery made up of a positive electrode and a negative electrode that occlude and discharge lithium ions, and a non-electrolytic solution.

Here, as for thicknesses of the respective layers of package film 9b, it is preferable from the viewpoint of processability as well as space efficiency that package film 9b be a laminate film with thicknesses of 10 to 100 μm for metal layer 9c, 10 to 40 μm for insulating layer 9d, and 30 to 200 μm for sealing layer 9e. However, the thicknesses are not limited thereto so long as the configuration agrees with the object of the present exemplary embodiment.

In the present invention, with the use of the package film in the above illustrated form, it is possible to obtain the effect of serving two purposes as described below in addition to known advantages such as being capable of reducing the thickness and weight of the battery and making an air-tight package only by using thermal pressing.

Communication circuit 1f is connected to metal layer 9c of cell 5, communication circuit 2f is connected to metal layer 9c of cell 6, and communication circuit 3f is connected to metal layer 9c of cell 7.

Communication circuit 1f and communication circuit 2f communicate with each other through wireless signals by using metal layer 9c of cell 5 and metal layer 9c of cell 6, and communication circuit 2f and communication circuit 3f communicate with each other through wireless signals by using metal layer 9c of cell 6 and metal layer 9c of cell 7.

Here, since respective main surfaces 9f of cell 5 and cell 6 are opposite to each other, metal layer 9c of cell 5 and metal layer 9c of cell 6 are in a state of being mutually opposite to each other.

In the case of using the package film of the foregoing preferred form, when cell 5 and cell 6 are made opposite to each other in a direct contact manner, the space between the metal layers is from 20 to 80 μm, and even in the case of not bringing the cells into contact with each other but providing a space (preferably within 2 mm) for cooling between the main surfaces, the space between the metal layers is in the order of 2.1 mm at the maximum. This brings communication circuit 1f and communication circuit 2f into a state that is equivalent to the case of being connected to each other through a capacitor made up of metal layer 9c of cell 5 and metal layer 9c of cell 6, so as to facilitate mutual communication between communication circuit 1f and communication circuit 2f. This state is the same as the state of bringing an antenna closer.

In this example, it is possible to use the metal layer as an antenna for communication, in order to simplify the configuration. Further, since the metal layers are adjacent and opposite to each other, it is possible to perform favorable communication in which the influence of noise from the outside is small.

In the exemplary embodiment and the examples described above, each of the illustrated configurations is a single example, and the present invention is not limited to the configurations.

For example, although only slave device 2 is used as the slave device having a rank that is neither the highest rank nor the lowest rank in the exemplary embodiment and in the examples described above, a plurality of slave devices having ranks that are neither the highest rank nor the lowest rank may be provided.

Further, a power line may be used as the communication line.

Moreover, the present invention is most effective when applied to a lithium-ion battery requiring precise control of an upper limit and a lower limit of a voltage. However, the battery is not limited to a lithium-ion battery but is changeable as appropriate.

Furthermore, as another background, when one cell enters an abnormal state and a thermal run away occurs causing heat generation, the heat that is generated is transmitted to the next cell, thereby spreading this abnormal situation. There is a fear that, in this manner, one runaway cell may bring about a chain reaction.

Thereat, discharging energy of all the cells prior to generation of the chain reaction can suppress the chain reaction which is an abnormal state.

On this account, in the above exemplary embodiment, when abnormality occurs in one cell and its voltage abnormally decreases or its temperature abnormally increases, it is desirable that the cell transmit information on the abnormality (temperature information) to another cell, and another cell that is not abnormal be self-discharged so as to safely discharge energy.

In this case, each communication circuit uses the cell temperature as cell-state information to be communicated with another communication circuit. Further, as determination for discharge, each CPU determines a cell as abnormal when it detects that its temperature is not lower than a certain set temperature, and transmits a signal indicating full discharge to another cell by use of the communication circuit while fully discharging the voltage of the corresponding cell by use of the equalization circuit. Moreover, upon acceptance of the signal indicating full discharge from another electric cell, each CPU transmits the signal indicating full discharge to another cell by use of the communication circuit while fully discharging the voltage of the corresponding cell by use of the equalization circuit.

Namely, each CPU discharges the corresponding cell based upon both the information on the cell-state information (cell temperature) of the corresponding cell and the eternal information (information from another electric cell) in order that all the electric cells in the battery pack are safely discharged under abnormal conditions.

A battery control system of the exemplary embodiment is one including three or more communication devices that correspond to individual cells and that have been previously ranked, and a management device that transmits an actuating signal to the communication device with the highest rank, wherein the highest-rank communication device includes: a first detection section for detecting a voltage value of the corresponding cell; a first adjustment section for adjusting a voltage of the corresponding cell; a first communication section for communicating with the management device and a communication device with a rank immediately following the highest rank; and a first control section for transmitting the voltage value detected by the first detection section from the first communication section to the immediately-following-rank communication device when the first communication section accepts the actuating signal, and for adjusting the voltage of the corresponding cell to a voltage value, accepted by the communication means from the immediately-following-rank transmission device, by use of the first adjustment section when the first communication section accepts the voltage value, the communication device with the lowest rank includes: a second detection section for detecting the voltage value of the corresponding cell; a second communication section for communicating with a communication device with a rank immediately preceding the lowest rank; a second control section for selecting the lower voltage value between a voltage value, accepted by the second communication section from the immediately-preceding-rank communication device, and the voltage value detected by the second detection section when the second communication section accepts the voltage value, to transmit the selected voltage value from the second communication section to the immediately-preceding-rank communication device; and a second adjustment section for adjusting a voltage of the corresponding cell to the voltage value selected by the second control section, the other of the communication devices includes: a third detection section for detecting a voltage value of the corresponding cell; a third communication section for communicating with communication devices with ranks immediately preceding and immediately following the other communication device; a third control section for transmitting a lower voltage value between a voltage value, accepted by the third communication section from the immediately-preceding-rank communication device, and the voltage value detected by the third detection section from the third communication section to the immediately-following-rank communication device when the third communication section accepts the voltage value, and transmitting a voltage value, accepted by the third communication section from the immediately-following-rank communication device, from the third communication section to the immediately-preceding-rank communication device when the third communication section accepts the voltage value, and a third adjustment section for adjusting a voltage of the corresponding cell to the voltage value accepted from the immediately-following-rank communication device.

Further, a battery control method of the exemplary embodiment is one performed by a battery control system including three communication devices or more that correspond to individual cells and that have been previously ranked, and a management device that transmits an actuating signal to the communication device with the highest rank, the method including: a first detection step in which the highest-rank communication device detects a voltage value of the corresponding cell; a second detection step in which the other of the communication devices different from the highest-rank and lowest-rank communication devices detects a voltage value of the corresponding cell; a third detection step in which the communication device with the lowest rank detects a voltage value of the corresponding cell; a first transmission step in which the highest-rank communication device transmits the voltage value detected in the first detection step to a communication device with a rank immediately following the highest rank in the case of accepting the actuating signal; a second transmission step in which the other communication device transmits, to a communication device with a rank immediately following the other communication device, a lower voltage value between a voltage value, accepted from a communication device with a rank immediately preceding the other communication device, and the voltage value detected in the second detection step in the case of accepting the voltage value; a third transmission step in which the lowest-rank communication device transmits, to a communication device with a rank immediately preceding the lowest-rank communication device, a lower voltage value between a voltage value, accepted from the communication device with a rank immediately preceding the lowest rank, and the voltage value detected in the third detection step in the case of accepting the voltage value; a first adjustment step in which the lowest-rank communication device adjusts the voltage of the cell corresponding to the lowest-rank communication device to the lower voltage value; a fourth transmission step in which the other communication device transmits a voltage value, accepted from the communication device with a rank immediately following the other communication device, to the communication device with a rank immediately preceding the other communication device in the case of accepting the voltage value; a second adjustment step in which the other communication device adjusts the voltage of the cell corresponding to the other communication device to the voltage value accepted from the immediately-following-rank communication device; and a third adjustment step in which the highest-rank communication device adjusts the voltage of the cell corresponding to the highest-rank communication device to a voltage value accepted from the communication device with a rank immediately following the highest-rank communication device in the case of accepting the voltage value.

According to the above exemplary embodiment, each communication device communicates information on a cell voltage in the order corresponding to its rank, and consequently, the lowest voltage value among a plurality of cells is shared among each communication device, and the voltage of each cell is adjusted to the lowest voltage.

On this account, arranging each communication device corresponding to its rank can shorten the communication distance among each communication device. Therefore, when each communication device communicates by wireless, it is possible to make the device resistant to the influence of noise. Further, when each communication device communicates by wire, it is possible to shorten the communication line, in order to reduce the size of the configuration.

Further, since the need for a management device for exchanging information individually with all the communication devices is eliminated, it is possible to reduce load on the management device.

In addition, it is desirable that the highest-rank communication device be adjacent to the communication device with a rank next to the highest rank, the lowest-rank communication device be adjacent to the communication device with a rank immediately preceding the lowest rank, and the other communication device be adjacent to the communication devices with ranks immediately preceding and immediately following the rank of the other communication device.

In this case, the communication distance among each communication device is shortened. Therefore, when each communication device communicates by wireless, it is possible to make the device resistant to the influence of noise. Further, when each communication device communicates by wire, it is possible to shorten the communication line, in order to reduce the size of the configuration.

Further, it is desirable that each of the cells be a film-packaged cell that includes a cell element and a package film that includes a metal layer to accommodate the cell element, each of the film-packaged cells be laminated in a state where its main surface is opposite to each other, and each of the first, second and third communication sections communicate with another communication section by use of the metal layer of the corresponding film-packaged cell.

In this case, it is possible to use the metal layer as an antenna for communication, in order to simplify the configuration. Further, since the metal layers are opposite to one another, it is possible to perform favorable communication.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

The invention claimed is:
1. An electric cell for a battery pack, comprising:
an electrochemical cell,
a communication unit communicating with other electric cells, the other electric cells include a first electric cell and a second electric cell,
a measurement unit acquiring cell-state of said electrochemical cell, and
a discharge unit discharging said electrochemical cell, wherein
said communication unit transmits said cell-state of said electrochemical cell and receives external information, and
said discharge unit discharges said electrochemical cell based upon both said cell-state of said electrochemical cell and said external information, wherein said cell-state includes information of a voltage of said electrochemical cell, and said communication unit comprises a transmission unit that transmits said cell-state of said electrochemical cell and a reception unit receiving said external information,
the electric cell
further comprising:
a control unit selecting a lower voltage between a voltage indicated by the external information received from the first electric cell and the voltage of said electrochemical cell acquired by said measurement unit,
causing said discharge unit to discharge said electrochemical cell such that the voltage of said electrochemical cell becomes the selected voltage when the selected voltage is the voltage indicated by the external information received from the first electric cell, and
causing said transmission unit to transmit a value of the selected voltage to the second electric cell, the second electric cell being different from the first electric cell.

2. The electric cell for a battery pack according to claim 1, wherein
the control unit further selects a lower voltage between a voltage indicated by the external information received from the second electric cell and the voltage of said electrochemical cell acquired by said measurement unit and causes said discharge unit to discharge said electrochemical cell such that the voltage of said electrochemical cell becomes the selected voltage when the selected voltage is the voltage indicated by the external information received from the second electric cell, and
cause said transmission unit to transmit a value of the selected voltage between the voltage indicated by the external information received from the second electric cell and the voltage of said electrochemical cell acquired by said measurement unit to the first electric cell.

3. A battery pack, including three or more electric cells which have been previously ranked and each of which has both a transmission unit and a reception unit, wherein
highest-rank electric cell is an electric cell comprising:
an electrochemical cell, a communication unit communicating with other electric cells, said communication unit comprising a transmission unit that transmits cell-state of said electrochemical cell and a reception unit that receives external information;

a measurement unit acquiring the cell-state of said electrochemical cell, the cell-state includes information of a voltage of said electrochemical cell;

a discharge unit discharging said electrochemical cell, a control unit causing said transmission unit to transmit the information of the voltage to another electric cell, and causing said discharge unit to discharge said electrochemical cell such that the voltage of said electrochemical cell becomes a voltage indicated by the external information, lowest-rank electric cell is an electric cell comprising:
an electrochemical cell,
a communication unit communicating with other electric cells, said communication unit comprising a transmission unit that transmits cell-state of said electrochemical cell and a reception unit that receives external information;
a measurement unit acquiring the cell-state of said electrochemical cell, the cell-state includes information of a voltage of said electrochemical cell;
a discharge unit discharging said electrochemical cell,
a control unit selecting a lower voltage between a voltage indicated by the external information and the voltage of said electrochemical cell acquired by said measurement unit, causing said discharge unit to discharge said electrochemical cell such that the voltage of said electrochemical cell becomes the selected voltage when the selected voltage is the voltage indicated by the external information, and causing said transmission unit to transmit a value of the selected voltage to another electric cell, other electric cells are electric cells comprising:
an electrochemical cell,
a communication unit communicating with other electric cells, said communication unit comprising a transmission unit that transmits cell-state of said electrochemical cell and a reception unit that receives external information;
a measurement unit acquiring the cell-state of said electrochemical cell, the cell-state includes information of a voltage of said electrochemical cell;
a discharge unit discharging said electrochemical cell,
a control unit causing said transmission unit to transmit a value of a lower voltage between a voltage indicated by the external information and the voltage of said electrochemical cell acquired by said measurement unit to another electric cell different from an electric cell that sent the external information, causing said discharge unit to discharge said electrochemical cell such that the voltage of said electrochemical cell becomes a voltage indicated by information received from said another electric cell different from said electric cell that sent the external information, and causing said transmission unit to transmit a value of the voltage indicated by the information received from said another electric cell different from said electric cell that sent to external information, said transmission unit of said highest-rank electric cell is connected with said reception unit of said electric cell with a rank immediately following said highest-rank, said reception unit of said highest-rank electric cell is connected with said transmission unit of said electric cell with a rank immediately following said highest-rank, said transmission unit of said lowest-rank electric cell is connected with said reception unit of said electric cell with a rank immediately preceding said lowest-rank, said reception unit of said lowest-rank electric cell is connected with said transmission unit of said electric cell with a rank immediately preceding said lowest-rank, said transmission unit of each of said other electric cells is connected with both said reception unit of said electric cell with a rank immediately following the rank of said transmission unit itself and said reception unit of said electric cell with a rank immediately preceding the rank of said transmission unit itself, and said reception unit of each said other electric cells is connected with both said transmission unit of said electric cell with a rank immediately following the rank of said reception unit itself and said transmission unit of said electric cell with a rank immediately preceding the rank of said reception unit itself.

* * * * *